(12) United States Patent
Parihar et al.

(10) Patent No.: US 10,534,814 B2
(45) Date of Patent: Jan. 14, 2020

(54) GENERATING SNIPPETS ON ONLINE SOCIAL NETWORKS

(71) Applicant: Facebook, Inc., Menlo Park, CA (US)

(72) Inventors: Kanishk Parihar, London (GB); Anton Bryl, London (GB)

(73) Assignee: Facebook, Inc., Menlo Park, CA (US)

( * ) Notice: Subject to any disclaimer, the term of this patent is extended or adjusted under 35 U.S.C. 154(b) by 973 days.

(21) Appl. No.: 14/938,685

(22) Filed: Nov. 11, 2015

(65) Prior Publication Data

US 2017/0132229 A1    May 11, 2017

(51) Int. Cl.
*G06F 16/00*    (2019.01)
*G06F 16/901*    (2019.01)

(52) U.S. Cl.
CPC ................ *G06F 16/9024* (2019.01)

(58) Field of Classification Search
CPC ......... G06F 17/30241; G06F 17/30554; G06F 17/30867; G06F 17/30705; G06F 17/30477; G06F 17/30528; G06F 3/04842; G06F 17/30861; G06F 17/5004; G06F 2217/04; G06F 17/3089; G06F 17/30991; G06F 3/0484; G06F 15/16; G06F 17/30014; G06F 3/048
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,836,044 B2 | 11/2010 | Kamvar |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |

(Continued)

*Primary Examiner* — Yicun Wu

(74) *Attorney, Agent, or Firm* — Baker Botts L.L.P.

(57) ABSTRACT

In one embodiment, a method includes accessing content objects of an online social network, each content object being associated with an entity of the online social network, where each content object includes content of the content object and is associated with metadata, generating a set of n-grams by extracting one or more n-grams from the content of the content object, calculating, for each extracted n-gram, a quality score for the n-gram based on occurrence counts associated with map tiles of a geographical map, where each occurrence count comprises a count of entities geographically located in a corresponding map tile and associated with the n-gram, generating a snippet-module including one or more of the extracted n-grams from the set of n-grams having quality-scores greater than a threshold quality-score, and sending, to a client system of a user of the online social network, the snippet-module for display to the user.

22 Claims, 12 Drawing Sheets

(56) References Cited

U.S. PATENT DOCUMENTS

| | | |
|---|---|---|
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2009/0319342 A1* | 12/2009 | Shilman ............ G06F 17/30864 |
| | | 705/7.41 |
| 2010/0017431 A1* | 1/2010 | Schmidt ............... G06Q 10/107 |
| | | 707/E17.046 |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0173264 A1* | 7/2011 | Kelly .................... G06Q 10/10 |
| | | 709/205 |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0047147 A1 | 2/2012 | Redstone |
| 2012/0059708 A1 | 3/2012 | Galas |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |

\* cited by examiner

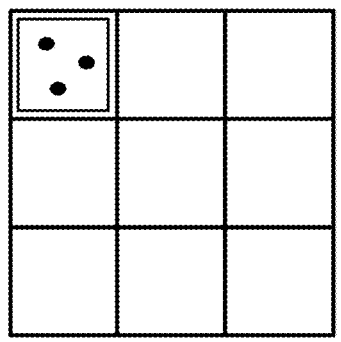
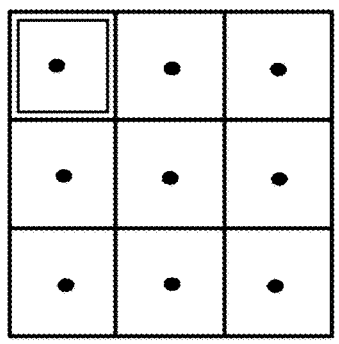
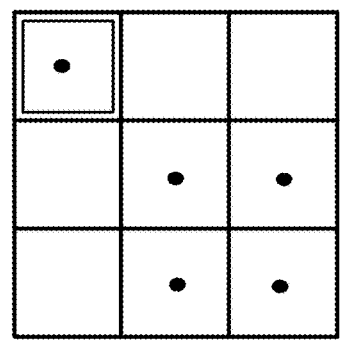
*FIG. 9A*  *FIG. 9B*  *FIG. 9C*
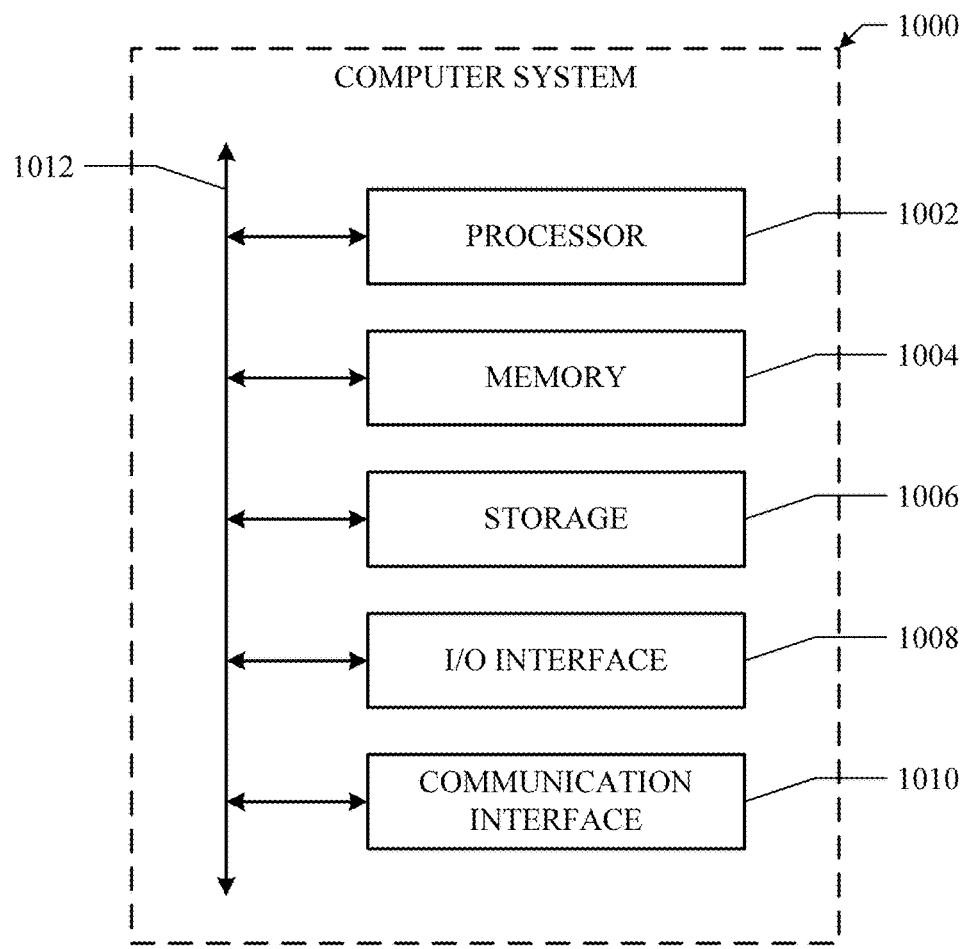
*FIG. 10*

GENERATING SNIPPETS ON ONLINE SOCIAL NETWORKS

TECHNICAL FIELD

This disclosure generally relates to identifying information related to objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual users within the networks, and edges represent the relationships between the users. The resulting graph-based structures are often very complex. In its simplest form, a social graph is a map of all of the relevant edges between all the nodes being studied.

SUMMARY OF PARTICULAR EMBODIMENTS

In particular embodiments, a set of snippets may be generated by extracting phrases from content such as comments associated with entities, filtering out low-quality phrases, and ranking the remaining phrases to identify high-quality snippets to be presented to a user. The snippets may be presented to the user in snippet-modules of an online social network user interface. The quality of the snippets presented to users may be increased by ranking and/or filtering the set of snippets based on additional information from sources other than the content and entities. The additional information may include occurrence counts of how many entities are geographically located in a corresponding map tile and associated with the n-gram, information about periodic calendar events associated with the snippets, sentiment features associated with the snippets, lists of words or patterns for which matching snippets are to be boosted in the ranking, and synonym dictionaries used to normalize occurrences of different extracted words or phrases having the same meaning.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 9A, 9B, and 9C illustrate example distributions of n-grams over tiles of maps.

FIG. 10 illustrates an example computer system.

DESCRIPTION OF EXAMPLE EMBODIMENTS

System Overview

Figure 1:
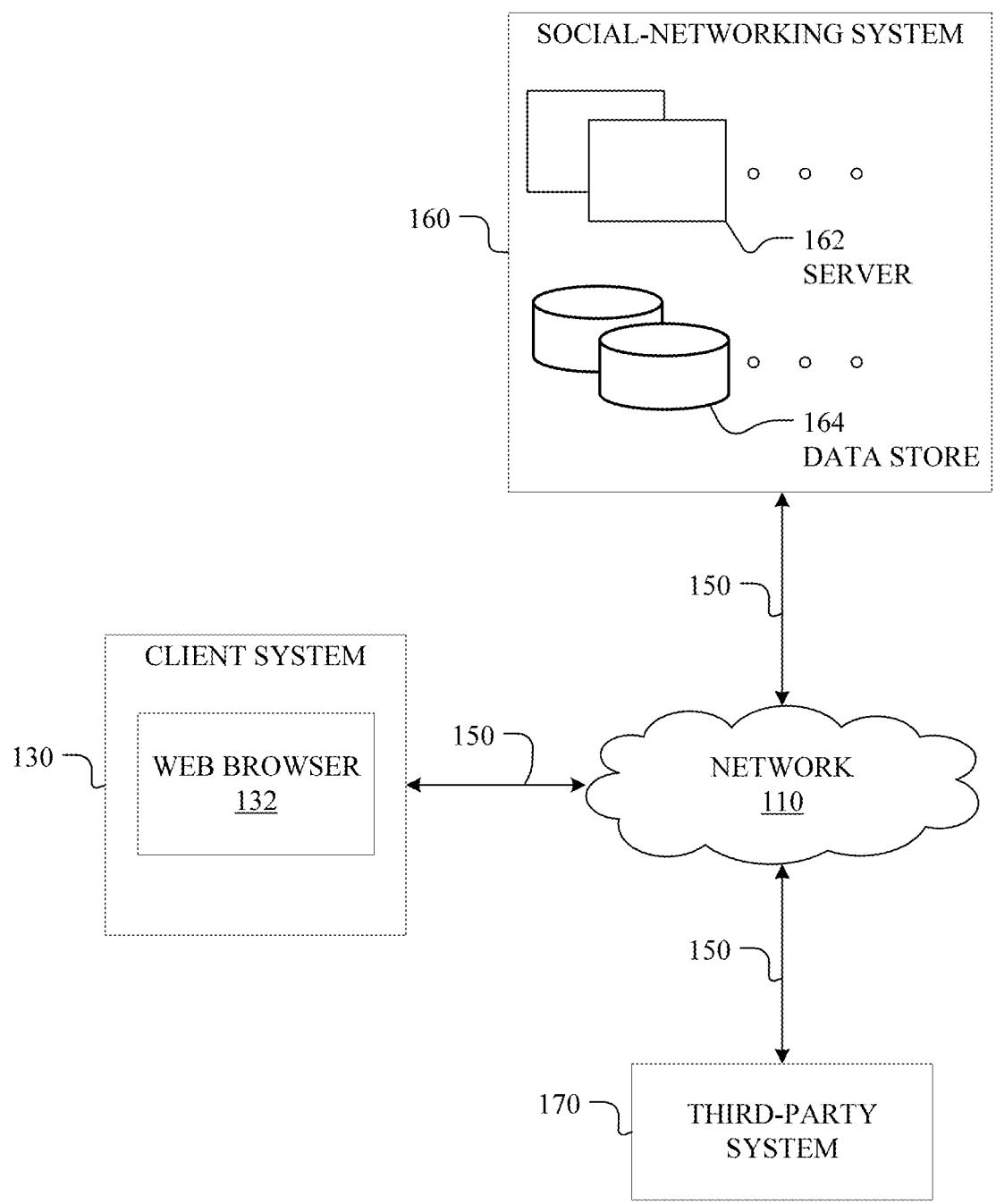
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
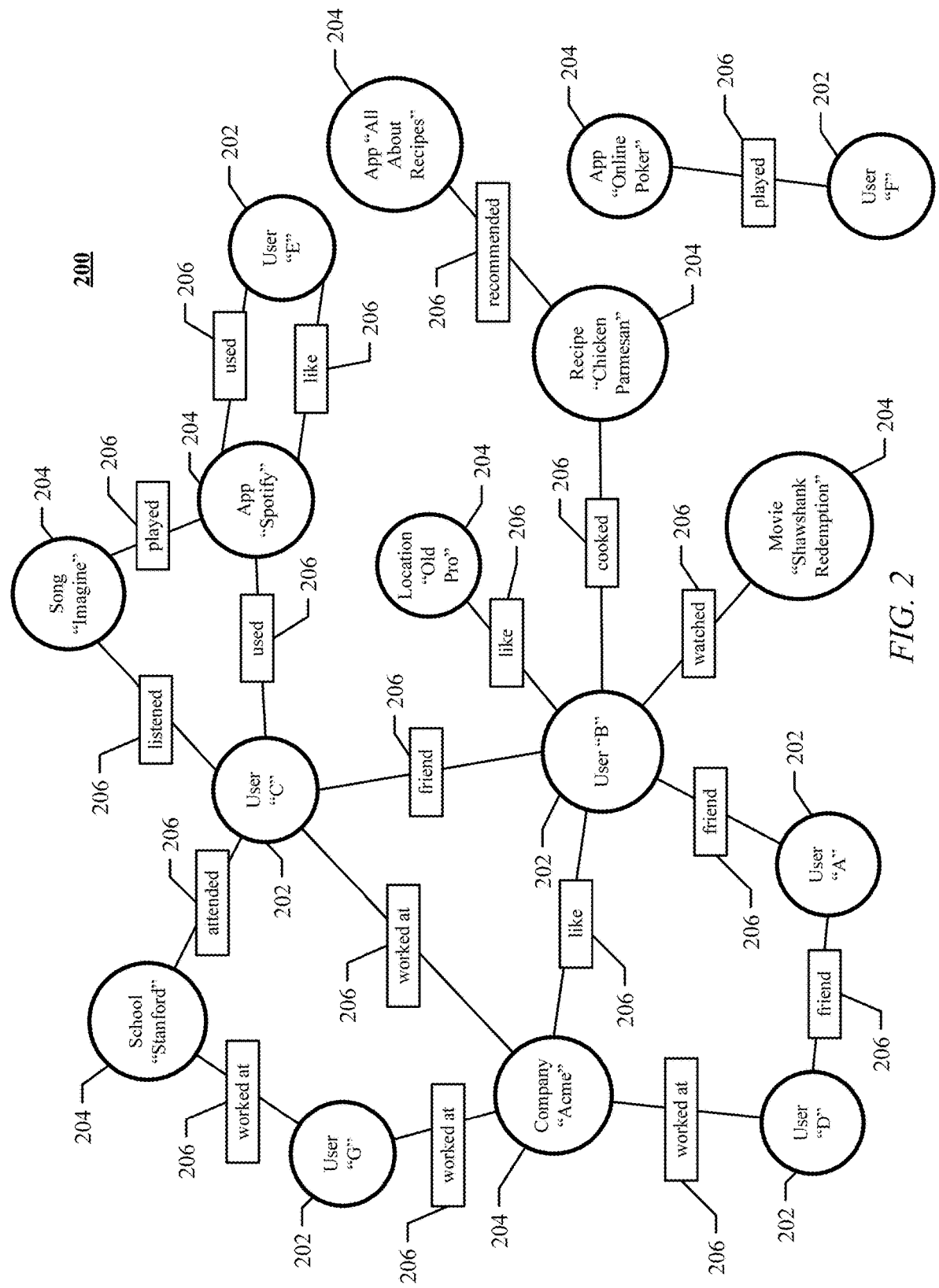
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface/view state of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile pages and respective user nodes 202 or concept nodes 204, such as a profile page named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Ranking and Filtering Snippets

In particular embodiments, a set of snippets for an entity may be generated by extracting phrases from content such as comments associated with the entity, filtering out low-quality phrases, and ranking the remaining phrases to identify high-quality snippets to be presented to a user. The snippets may be presented to the user in snippet-modules of an online social network user interface. The quality of the snippets presented to users may be increased by ranking and/or filtering the set of snippets based on additional information from sources other than the content and entities. The additional information may include occurrence counts of how many entities are geographically located in a corresponding map tile and associated with the n-gram, information about periodic calendar events associated with the snippets, sentiment features associated with the snippets, lists of words or patterns for which matching snippets are to be boosted in the ranking, and synonym dictionaries used to normalize occurrences of different extracted words or phrases having the same meaning. More information on generating snippets and snippets modules may be found in U.S. patent application Ser. No. 14/797,819, filed 13 Jul. 2015, which is incorporated by reference.

In particular embodiments, the social-networking system 160 may access a plurality of content objects of an online social network, each content object being associated with an entity of the online social network, wherein each content object comprises content of the content object and is associated with metadata. The social-networking system 160 may generate a set of n-grams by extracting one or more n-grams from the content of the content object. The content objects may include one or more posts, reviews, check-ins, or any combination thereof. More information on extracting n-grams from content objects may be found in U.S. patent application Ser. No. 14/797,819, filed 13 Jul. 2015, which is incorporated by reference.

In particular embodiments, the social-networking system 160 may calculate, for each extracted n-gram, a quality score for the n-gram based on occurrence counts associated with map tiles of a geographical map, wherein each occurrence count comprises a count of one or more entities geographically located in a corresponding map tile and associated with the n-gram. The geographic map may be divided into multiple tiles, and each tile may represent an area such as a city block, a neighborhood, a city, a region, or smaller or larger areas, depending on the resolution or zoom level of the map. Entities of the online-social network, such as restaurants, hotels, and other places, are associated with particular locations on the map, and the locations may correspond to real-world locations of the entities.

In particular embodiments, the one or more entities may be associated with the n-gram when each of the entities is associated with a snippet-module comprising the n-gram, or when text associated with each of the entities includes the n-gram. As an example and not by way of limitation, an entity may be associated with an n-gram by a previous snippet-generation operation that associated a snippet-module containing the n-gram with the entity, or if the entity's description, comments, or metadata (e.g., tags) include the n-gram.

In particular embodiments, the social-networking system 160 may calculate the quality score for the n-gram based on a similarity score that indicates a degree of similarity between the n-gram and an n-gram type. An n-gram "type" may be understood as a classification representing one of a set of different types that correspond to different meanings into which n-grams may be classified. N-gram types described herein include a location n-gram type, an event n-gram type, a sentiment n-gram type, and a topic n-gram type, which represent classifications for n-grams that refer to geographical locations, events such as calendar events, sentiments, and topics. A location n-gram may refer to a location, such as a town name, "Camden Town" or to a name or phrase associated with a particular location, e.g., "Camden Town Market" or "Camden Yard," or any other phrase that is associated with a larger number of entities that are near the n-gram's entity's local geographic than are outside the local geographic area. An event n-gram may refer to a periodic event, such as "New Year's Day." A sentiment n-gram may refer to a sentiment such as "happy" or "elated." A topic n-gram may refer to a topic such as "food" or "football." The quality score calculated for each extracted n-gram may be based on the similarity score, or on a combination of the similarity score and one or more other quality scores generated for the n-gram based on other measures, such as a TF-IDF score. The scores may be combined by, for example, calculating an average or weighted average of the similarity score and other quality scores.

In particular embodiments, the social-networking system 160 may determine an n-gram type for the n-gram based on the similarity score. The type of an n-gram is not necessarily known when the n-gram is extracted from content. The type of an n-gram may be determined based on the n-gram and other information available in the online social network, such as the entity for which the n-gram is being considered as a potential snippet, other entities, information associated with the entities, such as geographic maps, information associated with the user, such as calendar information, or other information, such as a sentiment database or data used by a topic tagger. As each n-gram type is a classification, and n-grams may be any phrases in a natural language, some n-grams may be better fits, e.g., more similar to, their classifications than other n-grams. Therefore, a similarity score may be determined between an n-gram and an n-gram type to indicate a degree of fit or similarity of the n-gram to the n-gram type. As an example and not by way of limitation, the n-gram "north pole" has a strong association with a specific geographical location, and may be assigned a high similarity score for the location n-gram type. In contrast, the n-gram "market" may refer to a geographical location, or may have other meanings that are not related to geographical locations, and so may be assigned a medium or low similarity score. Because of the difficulty in classifying n-grams into types based only on the n-grams themselves, additional information may be used to determine n-gram types, such as geographical information, user-related information, and so on. Although this disclosure describes and illustrates particular n-gram classifications including particular n-gram types in particular manners, the disclosure contemplates any suitable classifications including any suitable n-gram types in any suitable manners.

In particular embodiments, the similarity score for a particular n-gram and an n-gram type may be calculated differently for each n-gram type. The degree of similarity between an n-gram and an n-gram type may be represented by the similarity score. The similarity scores calculated for the different types may be compared to determine the n-gram's type. In particular embodiments, the similarity score may be calculated according to a type-specific method associated with each n-gram type. The similarity scores produced by the type-specific methods may then be evaluated to identify the n-gram type having the greatest score. For example, given an n-gram, similarity scores may be calculated for each of the location, event, sentiment, and topic n-gram types using respective type-specific calculations. The similarity scores may be decimal values between 0 and 1. The greatest similarity score calculated between an n-gram and an n-gram type may identify the type having the greatest similarity to the n-gram.

In particular embodiments, the similarity calculation for location n-grams may be based on n-gram "occurrence counts" associated with map tiles of a geographical map. Each occurrence count may be a count of how many entities are geographically located in a corresponding map tile and associated with the n-gram. As an example and not by way of limitation, the similarity calculation for event n-grams may be based on whether words implying periodic event are present in the n-gram, or whether the user's calendar contains periodic events matching the n-grams. As another example and not by way of limitation, the similarity calculation for sentiment n-grams may be based on whether the n-gram matches a name of a sentiment from a list of sentiments. As yet another example and not by way of limitation, the similarity calculation for topic n-grams may be based on whether the n-gram is generated by a topic tagger based on content of an entity, or, more specifically, on a confidence value produced by the topic tagger for the topic.

In particular embodiments, the social-networking system 160 may determine whether the n-gram type is informative for the entity. Certain types of n-grams may be considered more informative than other types of n-grams for certain types of entities. An n-gram may be informative for an entity if the n-gram contains information of interest to readers of snippets associated with the entity. Whether an n-gram is informative for a particular entity may depend on the entity's type, and may be an attribute of the entity's type that can be retrieved from the entity or from information associated with the entity, such as industry vertical information. For example, location n-grams, which may refer to entities in a particular geographic location. Location entities may be considered informative for hotel entities because users searching for hotels may be interested in location information. For example, users searching for hotels may be interested in information about entities near a hotel entity. However, location n-grams may be considered non-informative for restaurant entities, because local information is unlikely to be meaningful to the average user, who is unlikely to be familiar enough with the geographic location to know about names that are specific to the geographic location. The type of the entity, e.g., restaurant, hotel, and so on, may be identified by a "vertical" associated with the entity, such as a "restaurants" vertical or a "hotel" vertical, respectively.

Event n-grams, topics n-grams, and sentiment n-grams may be considered informative for all entity types in the examples described herein. However, this disclosure also contemplates n-grams of these types being informative conditionally upon the type of entity and/or other factors. For example, conditions upon which event, topic, or sentiment n-grams are considered informative may be based on properties of the entity, such as the type of vertical associated with the entity as described above for location n-grams.

In particular embodiments, the social-networking system 160 may increase the quality score based on the similarity score when the n-gram type is informative for the entity. That is, if an n-gram is determined to be informative, a similarity score calculated for the n-gram may be added to a quality score being calculated for the n-gram. In particular embodiments, the social-networking system 160 may decrease the quality score based on the similarity score when the n-gram type is not informative for the entity. For example, if the n-gram is determined to be uninformative, then the similarity score calculated for the n-gram may be subtracted from the quality score, or the quality score may be left unchanged.

In particular embodiments, determining an n-gram type for the n-gram may be based on whether the similarity score satisfies a threshold similarity condition. The threshold similarity condition may be, for example, that the similarity score is the greatest of the similarity scores calculated for each n-gram type for the current n-gram. In particular embodiments, for each of one or more predetermined n-gram types, a corresponding similarity score may be calculated based on the one of the predetermined n-gram types and the n-gram. One of the predetermined n-gram types for which the corresponding similarity score satisfies a threshold similarity condition may be selected, where the n-gram type corresponds to the selected one of the predetermined n-gram types. In particular embodiments, the corresponding similarity score may satisfy the threshold similarity condition when the corresponding similarity score satisfies a threshold similarity value and is a maximum of the one or more similarity scores. The threshold similarity condition may alternatively or additionally be that the selected corresponding similarity score is greater than or equal to a threshold value. As an example and not by way of limitation, if the similarity score is a number between 0 and 1, then the threshold value may be 0.5, 0.75, 0.9, or the like.

In particular embodiments, calculation of the similarity score for location n-grams may be based on the geographical locations of entities associated with the n-grams. The similarity score for a location n-gram may be calculated based on (1) the fraction of entities associated with the n-gram that are located in the same map tile as the entity for which the n-gram's quality score is being computed and/or (2) the fraction of map tiles in which an entity associated with the n-gram is located. Either location similarity score (1) or location similarity score (2) may be used as the similarity score, or quantities (1) and (2) may be combined (e.g., averaged), which may provide a more accurate measure of the similarity of the n-gram to the criteria for a geographical location than either (1) or (2) separately. Location similarity score (1) may be calculated by determining a count of entities in a first map tile of the geographical map that are associated with the n-gram, wherein the entity of the online social network is in the first map tile, and determining a count of entities in one or more second map tiles of the geographical map that are associated with the n-gram. Location similarity score (1) may then be calculated based on a ratio of the count of entities in the first map tile to the count of entities in the second map tiles. Location similarity score (2) may be calculated by determining a count of map tiles that include one or more entities that are associated with the n-gram. Location similarity score (2) may then be calculated based on a ratio of the count of map tiles that include one or more entities that are associated with the n-gram to a total number of map tiles in the geographical map. Further examples of location similarity calculations are illustrated in FIGS. 3, 4, 8C and 9A-C. More information on mapping tiles may be found in U.S. Pat. No. 8,914,393, filed 26 Nov. 2012, which is incorporated by reference.

Figure 3:
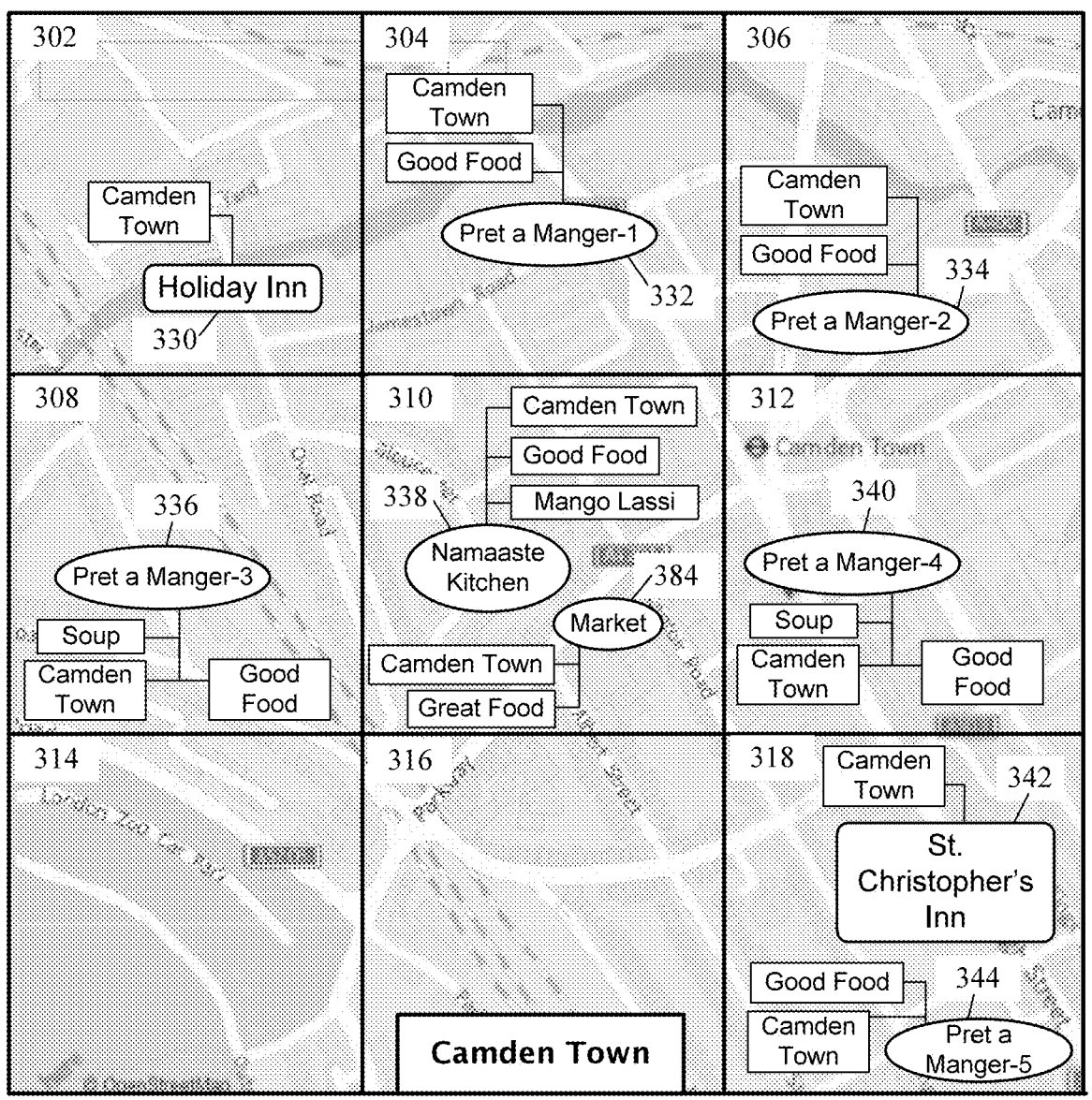
FIGS. 3 and 4 illustrate example maps and locations of entities in map tiles.
Figure 4:
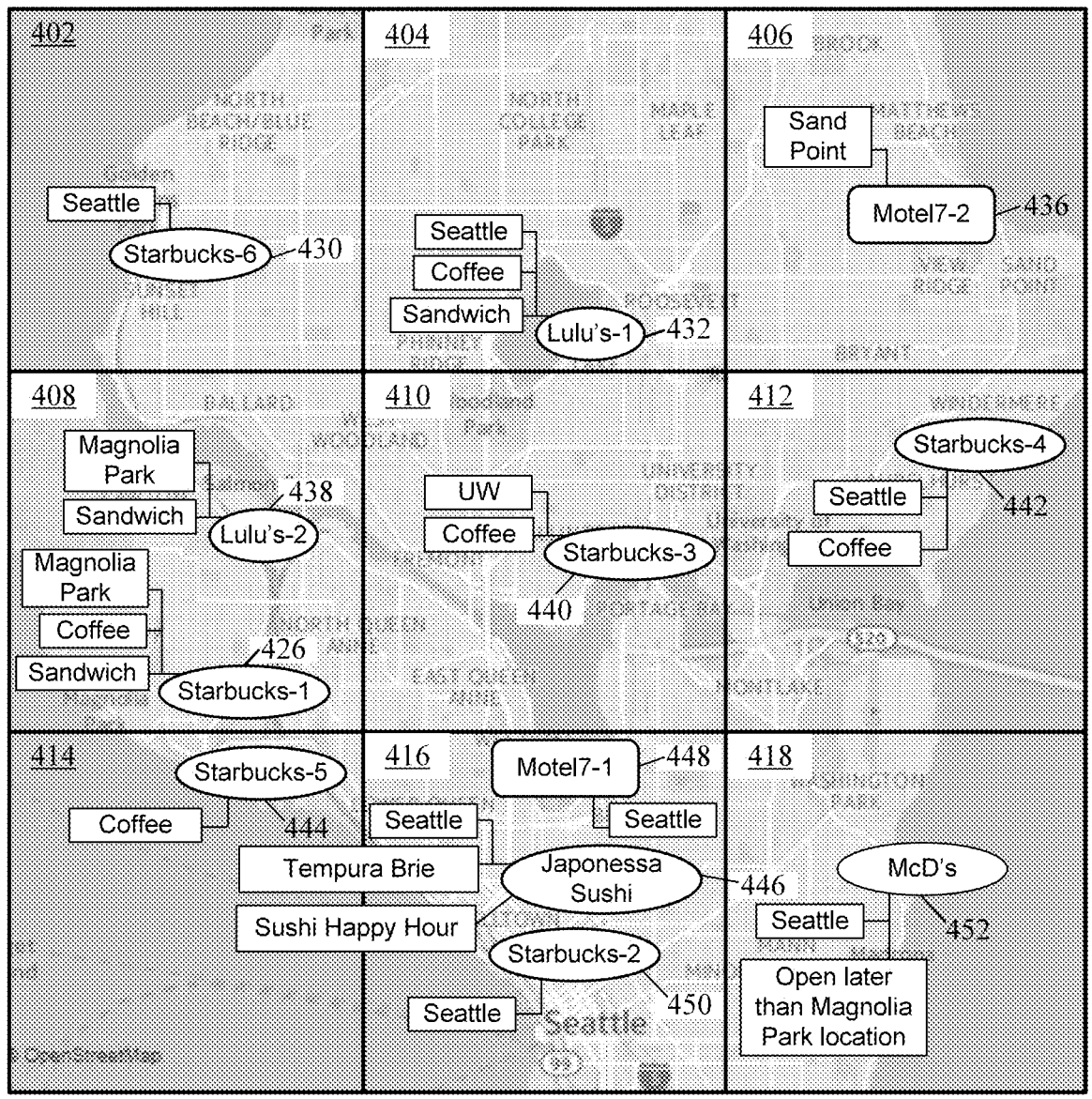

FIGS. 3 and 4 illustrate example maps and locations of entities in map tiles. FIG. 3 illustrates a map of the Camden Town neighborhood of London. The map includes nine tiles 302-318. Each tile corresponds to an area of approximately several city blocks. A hotel entity named Holiday Inn 330 is located in a first map tile 302 and has an associated n-gram Camden Town. The associated n-grams shown in FIGS. 3 and 4 may have been associated with the entities by a snippet association process or snippet generator, may be portions of content associated with the entities, or may be candidate n-grams to be evaluated for display in a set of n-grams with any of the entities shown on the maps. Restaurant entities named Pret a Manger-1 332 and Pret a Manger-2 334 are located in a second map tile 304 and a third map tile 306, respectively, and each have associated n-grams Camden Town and Good Food. A restaurant entity named Pret a Manger-3 336 is located in a fourth map tile 308 and has associated n-grams Camden Town, Good Food, and Soup. A restaurant entity named Namaaste Kitchen 338 is located in a fifth map tile 310 and has associated n-grams Camden Town, Good Food, and Mango Lassi. A restaurant entity named Market 384 is located in the fifth map tile 310 and has associated n-grams Camden Town and Great Food. A restaurant entity named Pret a Manger-4 340 is located in a sixth map tile 312 and has associated n-grams Camden Town, Good Food, and Soup. No entities are located in the seventh map tile 314 and eighth map tile 316. A hotel entity named St. Christopher's Inn 342 is located in a ninth map tile 318 and has associated n-gram Camden Town. A restaurant entity named Pret a Manger-5 344 is located in the ninth map tile 318 and has associated n-grams Camden and Good Food.

In FIG. 3, the n-gram Camden Town occurs in map tile 302 (associated with the Holiday Inn entity), in tile 304 (Pret a Manger-1), in tile 306 (Pret a Manger-2), in tile 308 (Pret a Manger-3), in tile 310 (Pret a Manger-4), in tile 318 (Pret a Manger-5), in tile 310 (Namaaste Kitchen), in tile 310 (Market), and in tile 318 (St. Christopher's Inn). The table further indicates that the n-gram Good Food occurs in tile 304 (Pret a Manger-1), 306 (Pret a Manger-2), 308 (Pret a Manger-3), 312 (Pret a Manger-4), 318 (Pret a Manger-5), and 310 (Namaaste Kitchen). The n-gram Great Food occurs in tile 310 (Market). The n-gram Soup occurs in tile 308 (Pret a Manger-3) and 312 (Pret a Manger-4). The n-gram Mango Lassi occurs in tile 310 (Namaaste Kitchen).

Figure 8A:
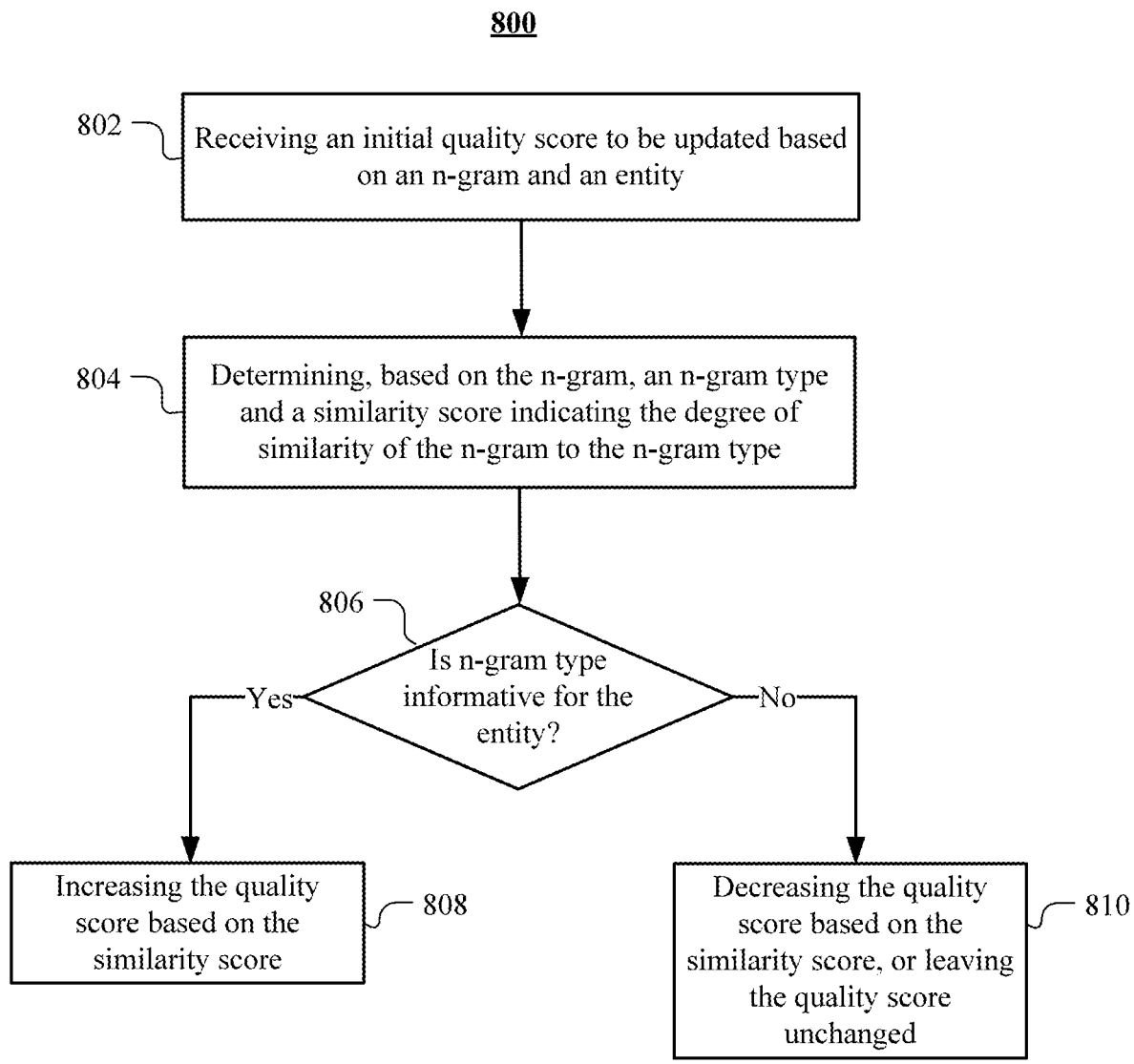
FIG. 8A illustrates an example method for calculating a quality score for an n-gram.
Figure 8B:
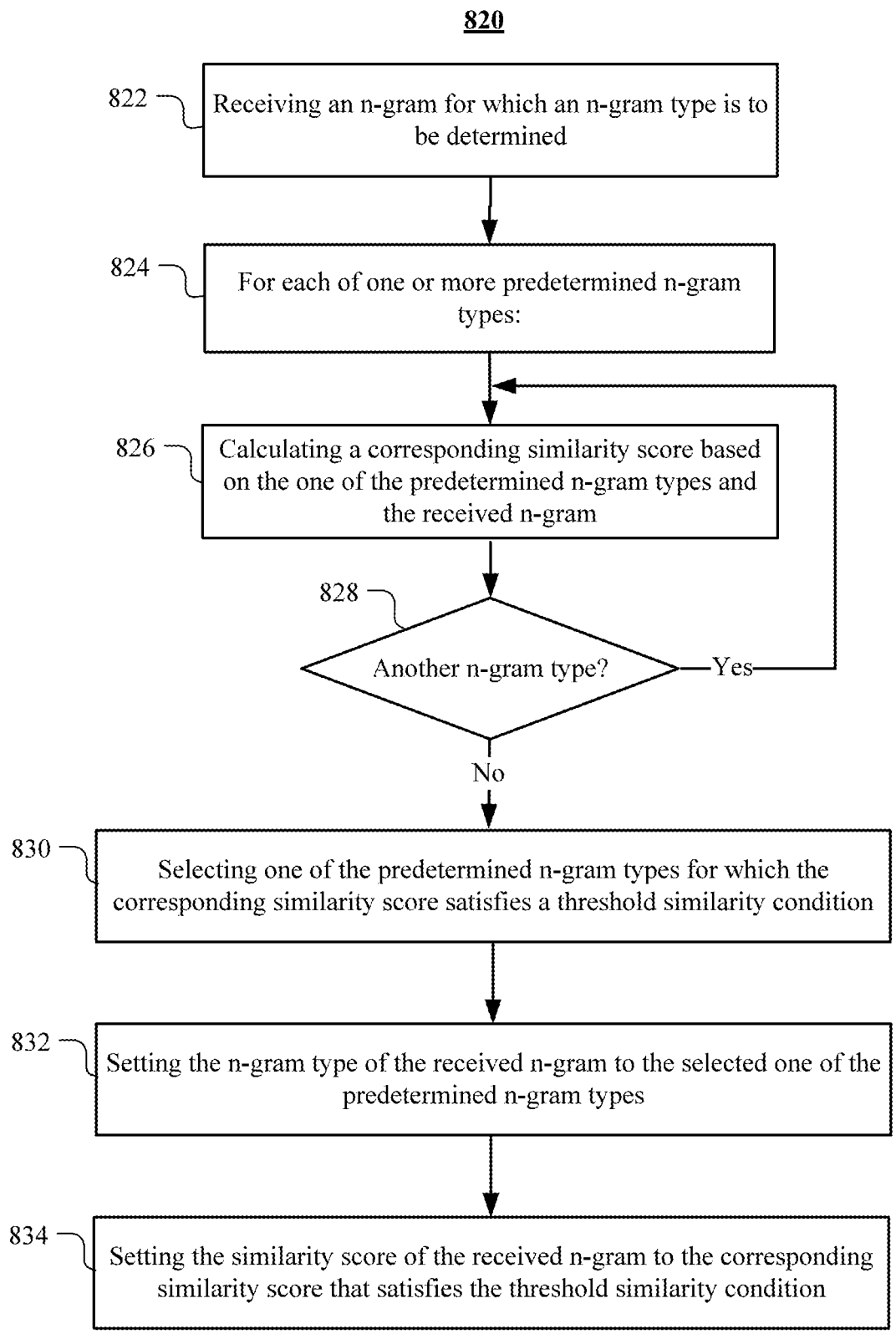
FIG. 8B illustrates an example method for determining an n-gram type for a given n-gram.
Figure 8C:
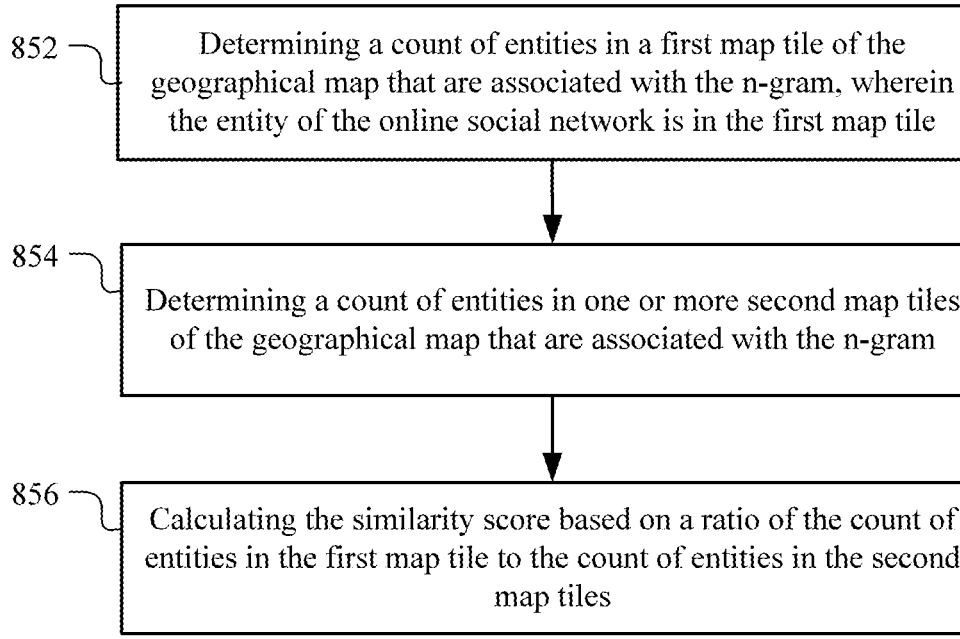
FIG. 8C illustrates an example method for calculating a similarity between an n-gram and a location n-gram type based on the fraction of entities associated with the n-gram that are located in the same map tile as the entity for which the n-gram's quality score is being computed.
Figure 8D:
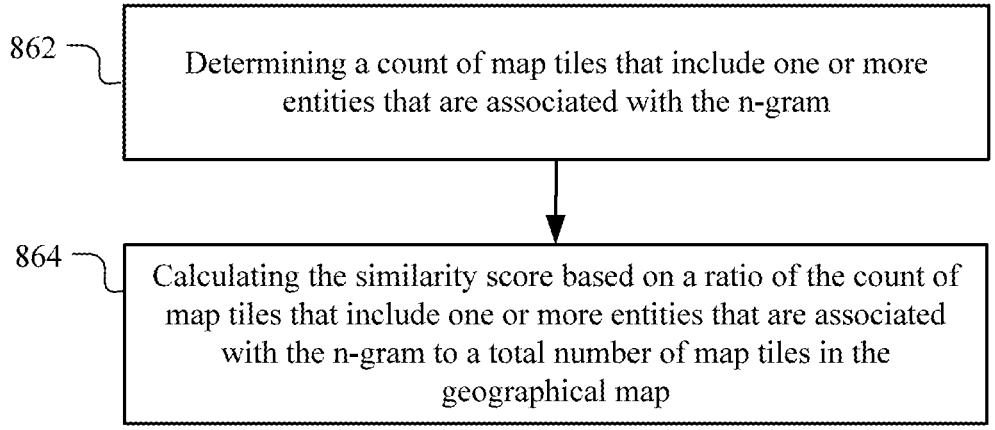
FIG. 8D illustrates an example method for calculating a similarity between an n-gram and a location n-gram type based on the fraction of map tiles in which an entity associated with the n-gram is located.

As an example and not by way of limitation, to calculate a quality score for the n-gram Camden Town for the entity Holiday Inn, the location similarity scores described in FIGS. 8C and 8D may be calculated and compared to a threshold condition. If the location similarity scores satisfy the threshold condition, then the Camden Town n-gram may be added to the set of n-grams for the Holiday Inn entity. The first location similarity score, described in FIG. 8C, is the fraction of entities associated with the n-gram that are located in the same map tile as the entity for which the n-gram's quality score is being computed. The first location similarity score is abbreviated herein as location similarity score (1), and may be calculated as follows:

$$\text{Location } similiarty \text{ score } 1 = \frac{\text{\# of } enities \text{ associated with } ngram \text{ in first tile}}{\text{\# of entities associated with } ngram \text{ in all tiles}}$$

The first map tile is the tile that contains the entity for which the quality score is being calculated. The entity is the Holiday Inn, so the first map tile is tile 302 of FIG. 3. There is one entity associated with the n-gram Camden Town, which is the entity Holiday Inn 330. The association between the n-gram Camden Town and the entity Holiday Inn 330 may be established by presence of the n-gram Camden Town in text associated with the entity Holiday Inn 330 (e.g., in a description or review of the entity). Alternatively, the association may be established by an existing snippet-module (for the Holiday Inn 330 entity) that contains the n-gram Camden Town. Other types of associations are possible as well. There are 9 entities associated with the n-gram Camden Town on the map 300. Therefore, location similarity score (1)=1/9 in this example, which indicates that the Camden Town n-gram has a low degree of similarity to a location n-gram according to this metric, since the n-gram only occurs once in the map tile 302 in which the entity is located, but occurs 8 more times in other map tiles. That is, the n-gram Camden Town is not particularly local to map tile 302.

As second example, a quality score may be determined for the n-gram Great Food in tile 310. The n-gram Great Food is associated with one entity in tile 310 (Market 384) and no entities in any other tiles of the map 300. Therefore, location similarity score (1)=1/1, which indicates that the Great Food n-gram is substantially local to tile 310 according to this metric.

The second location similarity score, described in FIG. 8D, is the fraction of map tiles in which an entity associated with the n-gram is located. The second location similarity score is abbreviated as location similarity score (2) herein, and may be calculated as follows:

$$\text{Location } similiarty \text{ score } 2 = 1 - \frac{\text{\# of map tiles containing an } enity \text{ associated with } ngram}{\text{total \# of tiles on map}}$$

For example, on the map 300, 7 map tiles contain at least one entity associated with the n-gram Camden Town. There are 9 tiles on the map, so location similarity score (2)=1−7/9=2/9, which indicates that the Camden Town n-gram has a low degree of similarity to a location n-gram according to this metric, since the n-gram occurs on a substantial portion of the tiles on the map. A combined location similarity score may be calculated as the average of scores (1) and (2). In this example, the combined score is (1/9+2/9)/2=1/6, which indicates that the n-gram Camden Town has a low degree of similarity to a location for the tile 302.

For the Great Food n-gram, the location similarity score (2)=1−1/9=8/9, because the n-gram only occurs in tile 310. This score indicates that the n-gram Camden Town has a high degree of similarity to a location according to this metric. The average of scores (1) and (2) for the Great Food n-gram is (1/1+8/9)/2=0.94, which indicates that the n-gram Great Food has a high degree of similarity to a location for tile 310 according to both metrics.

FIG. 4 illustrates a map of the city of Seattle, Wash. The map includes 9 tiles 402-418. Each tile corresponds to a portion of the city encompassing one or more neighborhoods. A restaurant entity named Starbucks-6 430 is located in a first map tile 402 and has an associated n-gram Seattle. A restaurant entity named Lulu's-1 432 is located in a second map tile 404 and has associated n-grams Seattle, Coffee, and Sandwich. A hotel entity named Motel 7-2 436 is located in a third map tile 406 and has an associated n-gram Sand Point. A restaurant entity named Lulu's-2 438 is located in a fourth map tile 408 and has associated n-grams Magnolia Park and Sandwich. A restaurant entity named Starbucks-1 426 is located in the fourth map tile 408 and has associated n-grams Magnolia Park, Coffee, and Sandwich. A restaurant entity named Starbucks-3 440 is located in a fifth map tile 410 and has associated n-grams UW and Coffee. A restaurant entity named Starbucks-4 442 is located in a sixth map tile 412 and has an associated n-gram Coffee. A restaurant entity named Starbucks-5 444 is located in a seventh map tile 414 and has an associated n-gram Coffee. A hotel entity named Motel 7-1 448 is located in an eighth map tile 416 and has an associated n-gram Seattle. A restaurant entity named Japonessa Sushi 446 is located in the eighth map tile 416 and has associated n-grams Tempura Brie and Sushi Happy Hour. A restaurant entity named Starbucks-2 450 is located in the eighth map tile 416 and has an associated n-gram Seattle. A restaurant entity named McD's 452 is located in a ninth map tile 418 and has associated n-grams Seattle and Open later than Magnolia Park location.

In FIG. 4, the n-gram Seattle occurs in map tile 404 (associated with the entity Lulu's-1), tile 416 (Japonessa Sushi, Motel 7-1, Starbucks-2), tile 412 (Starbucks-4), tile 402 (Starbucks-6), and tile 418 (McD's). The table further indicates that the n-gram Magnolia Park occurs in tile 408 (Lulu's-2 and Starbucks-1). The n-gram UW appears in tile 410 (Starbucks-3). The n-gram Coffee appears in tile 404 (Lulu's-1), tile 408 (Starbucks-1), tile 410 (Starbucks-3), tile 412 (Starbucks-4), and tile 414 (Starbucks-5). The n-gram Sandwich occurs in tile 404 (Lulu's-1), tile 408 (Lulu's-2), and tile 408 (Starbucks-1). The n-gram Sand Point occurs in tile 406 (Motel 7-1). The n-gram Good Tuna Roll appears in tile 416 (Japonessa Sushi). The n-gram Open Later than Magnolia Park location occurs in tile 418 (McD's).

For example, a quality score may be calculated for the n-gram Seattle associated with the entity Japonessa Sushi 446 in tile 416 as follows. Location similarity score (1)=3 entities associated with Seattle in first tile 416/7 entities associated with Seattle in all tiles. Therefore, similarity score (1)=3/7=0.43, which indicates a medium degree of similarity to a location for tile 416. Location similarity score (2)=1−(5 tiles containing an entity associated with Seattle/9 tiles total)=1−(5/9)=0.44, which indicates a medium degree of similarity to a location. The average of (1) and (2) is (0.43+0.44)/2=0.44, so the n-gram Seattle has a medium degree of similarity to a location for tile 416 according to both metrics.

As another example, referring to FIG. 4, a quality score may be calculated for the n-gram Seattle for the entity Starbucks-6 in the tile 402 as follows. Location similarity score (1)=1 entity associated with Seattle in first tile 402/7 entities associated with Seattle in all tiles. Therefore, similarity score (1)=1/7=0.14, which indicates a low degree of similarity to a location for tile 402. Location similarity score (2)=0.44 (from above). The average of (1) and (2) is (0.14+0.44)/2=0.27, so the n-gram Seattle has a low-medium degree of similarity to a location for tile 402 according to both metrics.

As another example, referring to FIG. 4, a quality score may be calculated for the n-gram Magnolia Park associated with the entity Lulu's-2 in tile 408 as follows. Location similarity score (1)=2 entities associated with Magnolia Park in the first tile/2 entities associated with Magnolia Park in all tiles. Therefore, similarity score (1)=2/2=1, which indicates a high degree of similarity to a location for tile 408. Location similarity score (2)=1−(1 tiles containing an entity associated with Magnolia Park/9 tiles total)=1−(1/9)=0.9, which indicates a high degree of similarity. The average of (1) and (2) is (1+0.9)/2=0.95, so the n-gram Magnolia Park has a high degree of similarity to a location for tile 408 according to both metrics.

In particular embodiments, calculation of the similarity score for event n-grams may be based on whether the n-grams are associated with periodically-occurring events. The similarity score for an event n-gram may be based on one or more event score quantities, including (1) whether the n-gram comprises a word or phrase having a periodic meaning, (2) occurrences of the n-gram in periodic (e.g., repeating) events on the user's online calendar, and the amount of deviation of time between those events from an average period of time, and/or (3) a ratio of the count of periodic calendar events in a range of time that contain the n-gram to a maximum number of time periods in the range of time.

For example, the calculation of event score (1) may increase the similarity score when the n-gram includes at least one word or phrase having a periodic meaning. Words or phrases that have periodic meaning include: "every" followed by a day or day of the week name, month name, year, "morning, "afternoon", "night", "day", "week" "month", "year", e.g., "Every Thursday", a plural day name, e.g., "Thursdays", the word "mornings", "afternoons", or "evenings", "anniversary", "birthday", a name of a holiday or other periodic event. The similarity score may be set to a high value (e.g., 1.0) if the n-gram contains one or more of these periodic words or phrases. An absolute date, e.g., "9/10/2011" or a phrase such as "this", "next", or "last" followed by a day of the week, e.g., "This Friday", may indicate that the n-gram does not have periodic meaning. The similarity score may be set to a low value (e.g., 0) if the n-gram contains one or more of these absolute words or phrases. The event similarity score (or a fractional portion thereof) may be set to a value between 0 and 1 if the n-gram contains a portion of or phrases similar to one of the periodic or absolute words or phrases, in proportion to how similar the n-gram is to the periodic or absolute word or phrase.

In particular embodiments, as introduced above, the event similarity score may be based on calendar events associated with the user, e.g., calendar events stored in the online social network or in a calendar application on behalf of the user. In particular embodiments, event score (2) may be calculated by identifying a set of calendar events associated with a user of the online social network, wherein each of the calendar events is associated with a date or time and is further associated with text that comprises the n-gram. Event similarity score (2) may then be calculated as an average period of time between calendar events that are associated with consecutive dates or times, and calculating a deviation from the average period of time, wherein the similarity score is based on the deviation. The deviation may be, for example, a statistical standard deviation.

In particular embodiments, event score similarity score (3) may be calculated based on a count of the calendar events that are associated with dates or times that occur within a range of time from a selected date or time and correspond to multiples of the average period, wherein the multiples of the average period are relative to a date or time at which one of the calendar events occurs. Event similarity score (3) may be calculated as a ratio of the count of the calendar events to a maximum number of time periods in the range of time.

In particular embodiments, calculation of the similarity score for sentiment n-grams may include determining whether the n-gram comprises a sentiment name, and, when the n-gram comprises a sentiment name, increasing the similarity score. The sentiment names may be, e.g., "Happy", "Elated", and so on, and may be retrieved from a database of sentiment names, such as a minutiae database, or the like. The similarity score for a sentiment n-gram may be set to a high value, e.g., 1.0, if the n-gram contains one or more sentiment names, or to a low value, e.g., 0, if the n-gram does not contain any sentiment names. The sentiment similarity score (or a fractional portion thereof) may be set to a value between 0 and 1 if the n-gram contains a portion of or phrases similar to one of the sentiment names, in proportion to how similar the n-gram is to the sentiment name.

Minutiae/sentiment names can be retrieved from a structured dictionary that provides words and actions related to the words. For example, for the minutia item "eating hot pocket," "eating" is the action and "hot pocket" is the word. A minutia item may be associated with a selected piece of content. For example, the minutia item "eating hot pocket" may be tagged by the user with the content text "study break." In particular embodiments, a minutiae database may contain an action portion of each minutiae item, e.g., "feeling" and a sentiment portion, e.g., "happy". Since minutiae occur along with text, the action portion of a minutia item can be used to identify a "sense" of the tagged text, e.g., whether the text is an event, topic, or sentiment. The word associated with the minutia item can further be used to determine the particular type, topic, or sentiment of the tagged text. For example, text content is tagged or associated with the minutia "feeling happy," then the sense of the text is "feeling", and the sentiment of the text is "happy." As another example, given an n-gram "Camden Town" associated with the minutia item "travelling to Camden Town," the fact that Camden Town is a place, and therefore a location-type n-gram, may be inferred from the action "travelling" in the minutia item. As another example, given the n-gram "Memorial Day" and a minutia item "celebrating Memorial Day," the fact that Memorial Day is an event can be inferred from the action "celebrating" in the minutia item. As another example, the action "eating" gives a sense of topic, and more particularly, food. The action "feeling" gives a sense of sentiment. Thus, the sentiment of the n-gram may be used to classify the n-gram as a location or event n-gram, and set the n-gram's type to the location type or the event type, respectively.

In particular embodiments, to determine whether an n-gram is a sentiment n-gram, the social-networking system 160 may determine whether the source content is tagged with a sentiment item. If so, then the n-gram may be categorized as a sentiment n-gram, or the sentiment may be further evaluated to determine whether the sentiment corresponds to another type of n-gram, such as a location or an event. If the sentiment indicates a location, then the n-gram may be categorized as a location n-gram. If the sentiment indicates an event, then the n-gram may be categorized as an event n-gram. Otherwise, the n-gram may be categorized as a sentiment n-gram, and the particular sentiment (e.g., happy) may be associated with the sentiment n-gram. In particular embodiments, to determine whether an n-gram is a topic n-gram, the n-gram may be evaluated by a topic tagger. If the topic tagger identifies a topic in the n-gram, then the n-gram may be categorized as a topic n-gram. Although specific types of n-grams are described, other types of n-grams are contemplated. Although particular techniques for determining n-gram types are disclosed herein, n-gram types may be identified in other ways, e.g., by applying natural language recognition to the n-grams to categorize the n-grams into types.

In particular embodiments, calculating the similarity score for topic n-grams may include generating, using a topic tagger, one or more topics based on the n-gram, wherein the similarity score is based on a result of the topic tagger. The topic similarity score may be set to a relatively high value, e.g., 1.0, if the n-gram contains a topic name, or to a relatively low value, e.g., 0, if the n-gram does not contain a topic name. In particular embodiments, the topic similarity score may be based on a confidence value generated by the topic tagger.

In particular embodiments, calculating the quality score for the n-gram may include boosting the quality score when the n-gram comprises one or more specified words or matches a specified pattern. As an example and not by way of limitation, the quality score of n-grams containing words or patterns that are on a list may be boosted. The list may be different for different vertical domains. For example, in the restaurant vertical domain, the list may be based on menus from restaurants (e.g., menus retrieved from Web sites). Text that appears in in menus, e.g., the words "appetizer" and "entree" may be added to the list of words to be boosted for entities in the restaurant vertical domain.

In particular embodiments, when an n-gram has been extracted from a content object, the social-networking system 160 may determine whether the extracted n-gram is a synonym for another word or phrase, and if so, use the other word or phrase instead of the extracted n-gram. That is, synonyms may treated as equivalent. Synonym recognition may be based on patterns and a list of synonyms. For example, if the input content contains the n-grams "good food", "great food", and "amazing food", and the dictionary indicates that "great food" and "amazing food" are synonyms of "good food", then the three synonyms are considered equivalent. For example, the n-grams "great food" and "good food" may be assigned the same quality score determined for "good food".

In particular embodiments, the social-networking system 160 may generate an n-gram-module comprising one or more of the extracted n-grams from the set of n-grams having quality-scores greater than a threshold quality-score. In particular embodiments, the social-networking system 160 may send, to a client system of a first user of the online social network, the n-gram-module for display to the user. More information on generating and sending n-grams-modules may be found in U.S. patent application Ser. No. 14/797,819, filed 13 Jul. 2015, and U.S. patent application Ser. No. 14/695,540 filed 24 Apr. 2015, which are incorporated by reference.

Figure 5:
FIG. 5 illustrates an example user interface of a client system that includes example snippet-modules.

FIG. 5 illustrates an example user interface 500 of client system 130 that includes an example portion of a profile page and an example n-gram-module 502. The user interface 500 may be generated by social-networking system 160 for a user of client system 130. In particular embodiments, client system 130 may be a mobile computing device such as, for example, a cellular phone of the user. The user interface 500 includes a profile-page for the restaurant entity "Japonessa Sushi Cocina." The profile-page includes highlights of the restaurant such as, for example, "1,602 people like this," "Open," "$$," and "Takes Reservations," In addition, the profile-page includes snippet-module 502 that includes further highlights of the restaurant entity on the online social network. Snippet-module 502 may display one or more n-grams that include noun-phrase n-grams extracted from content objects of various object-types (e.g., posts, comments, reviews, and messages) relevant to the restaurant entity on the online social network. In the example of FIG. 5, snippet-module 502 displays an n-gram "People talk about tempura brie and sushi happy hour here," where "tempura brie" and "sushi happy hour" correspond to noun-phrase n-grams extracted from previous posts and reviews of the restaurant entity on the online social network. As another example, the snippet-module 502 may be included in a review-page (not shown) for the restaurant entity, or in a reviews section of the profile-page for the restaurant entity. Although this disclosure describes and illustrates particular user interfaces including particular snippet-modules in particular manners, the disclosure contemplates any suitable user interfaces including any suitable snippet-modules in any suitable manners.

In particular embodiments, social-networking system 160 may generate and send for display to a client system 130 a user a snippet-module that includes n-grams associated with an entity of the online social network. The entity may be associated with an entity-type such as, for example, a restaurant, a celebrity, a place, an outdoors group, a festival event, or any suitable type of entity. The snippet-module may be generated and sent to the user when the user accesses a profile-page for the entity, or in a search-results or nearby-places page that includes the entity on the online social network. As an example and not by way of limitation, referencing FIG. 5, social-networking system 160 may generate snippet-module 500 that displays one or more snippets when the user accesses a profile-page of the restaurant entity "Japonessa Sushi Cocina." The snippets may correspond to n-grams extracted from online social network posts associated with the entity. Furthermore, each extracted n-gram may include a noun phrase. The noun phrase may include, for example, at least one noun, at least one noun and at least one adjective, at least one noun and at least one conjunction, or any suitable combination thereof. Herein, reference to a snippet may encompass a noun-phrase n-gram, or vice-versa, where appropriate. The term "post" as used herein may include a publication created by a user on a newsfeed page of the online social network, a homepage of the online social network, the user's page (e.g., a post on the user's timeline or wall) on the online social network, a profile-page of the entity on the online social network (e.g. a review on the entity's page), a page of the user's connection (e.g., a post on the wall of the user's first-degree connection or the user's friend) on the online social network, a page of a group (e.g., a post on a wall of a group related to a hobby) on the online social network, or any suitable page on the online social network. More information on snippets-modules may be found in U.S. patent application Ser. No. 14/797,819, filed 13 Jul. 2015, and U.S. patent application Ser. No. 14/695,540 filed 24 Apr. 2015, which are incorporated by reference.

Figure 6:
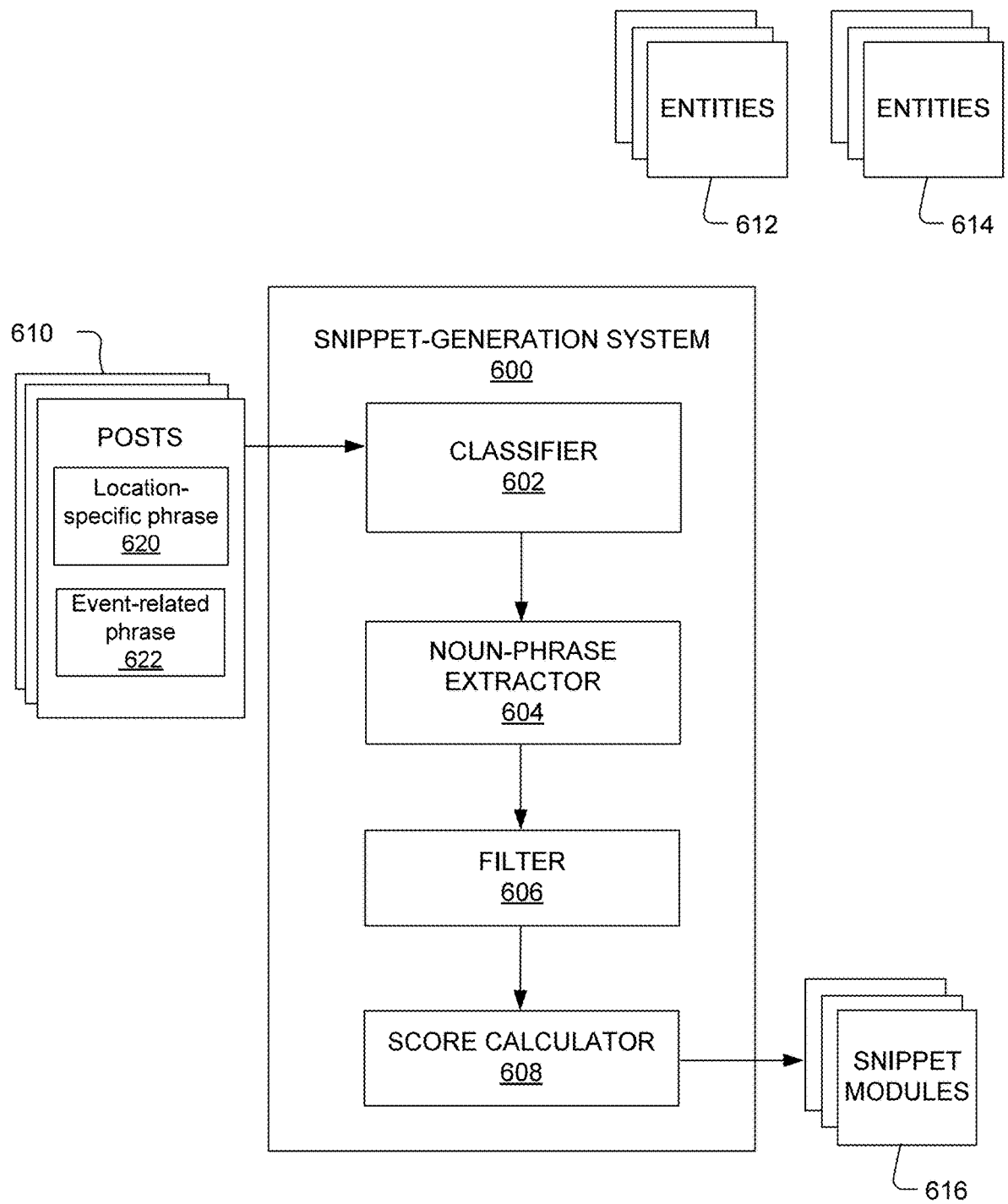
FIG. 6 illustrates an example snippet-generation system for generating snippet-modules.

FIG. 6 illustrates an example snippet-generation system 600 for generating snippet-modules. Snippet-generation system 160 may be third-party system 170 or may be a part of social-networking system 160. In particular embodiments, snippet-generation system 600 may access one or more posts 610 of an online social network hosted by social-networking system 160, where the posts are associated with an entity 612, 614 of social-networking system 160, and generate one or more snippet-modules 616 for display to a user on the online social network.

As an example and not by way of limitation, snippet-generation system 600 may access posts 610 on a profile-page of the restaurant entity "Japonessa Sushi Cocina," and posts 610 on the user's timeline tagged with the restaurant entity (e.g., timeline posts 610 associated with one of the tags "Japonessa Sushi Cocina" or "restaurant"). Snippet-generation system 600 may also generate an updated snippet-module 616 in response to a new post 610. As an example and not by way of limitation, a post 620 that includes a location-specific phrase such as "Magnolia Park" or "Sand Point" may cause a snippet-module 616 to be generated with a location n-gram "Magnolia Park" or "Sand Point" for the entity Lulu's-2 438 or the entity Motel 7-2 436, respectively, depending on whether location n-grams are informative for the respective entities. If location n-grams are not informative for restaurant entities, then a snippet-module 616 may not be generated for the entity restaurant entity Lulu's-2 438. If location n-grams are informative for hotel entities, then a snippet-module 616 may be generated for the hotel entity Motel 7-2 436 with the n-gram text "Sand Point." As an example and not by way of limitation, a post 622 that includes an event-specific phrase such as "New Year's Day" may cause a snippet-module 616 to be generated with an event n-gram "New Year's Day" if event n-grams are informative for the entity 612. If event n-grams are not informative for the entity 612, then the event n-gram may not be generated for the entity 612.

In particular embodiments, snippet-generation system 600 may include classifier 602. Classifier 602 may take as input posts 610 and classify each post 610 as being relevant (e.g., review-like) or irrelevant (e.g., not review-like) to the entity 612. Each post 610 may be classified based at least on the content of the post 610 and the metadata associated with the post 610. In particular embodiments, classifier 602 may parse the content of each post 610 to extract n-grams from the post 610. In particular embodiments, classifier 602 may be based on a trained classifier algorithm that identifies whether each post 610 is relevant to an entity 612. More information on classifying posts for use in generating snippets may be found in U.S. patent application Ser. No. 14/797,819, filed 13 Jul. 2015, which is incorporated by reference.

In particular embodiments, snippet-generation system 600 may include a noun-phrase extractor 602. Noun-phrase extractor 602 may extract n-grams that correspond to noun phrases from posts 610 that are classified as being relevant to the entity 612. The noun-phrase extractor 602 may perform part-of-speech (POS) tagging on the posts 610, and group the resulting POS-tagged tokens to identify candidate noun phrases. The noun-phrase extractor 602 may use a list of a number of different sequences of parts of speech, where each sequence represents a valid noun phrase. Example sequences in the list may include (noun, noun), e.g., "steak house", (adjective, noun), e.g., "great sandwich", (noun, noun, conjunction, noun, noun), e.g., "date night and ballroom dance), or any other sequence of parts of speech that can form a valid noun phrase. Each n-gram that matches one of the sequences in the list is passed on to the next stage in the snippet-generation system 600; n-grams that do not match any of the sequences may be removed from consideration. Although this disclosure describes extracting particular content in a particular manner, the disclosure contemplates extracting any suitable content in any suitable manner. More information on classifying posts for use in generating snippets may be found in U.S. patent application Ser. No. 14/797,819, filed 13 Jul. 2015, which is incorporated by reference.

In particular embodiments, snippet-generation system 600 may include filter 606. Filter 606 may receive n-grams from the noun-phrase extractor 604 and remove n-grams from consideration based on filtering criteria. More information on filtering n-grams and generating snippets may be found in U.S. patent application Ser. No. 14/797,819, filed 13 Jul. 2015, which is incorporated by reference. Although this disclosure describes filtering particular content in a particular manner, the disclosure contemplates filtering any suitable content in any suitable manner.

In particular embodiments, snippet-generation system 600 may include score calculator 608. For example, score calculator 608 may calculate a quality-score for each n-gram received from the filter 606, and use the score to determine whether to include the n-gram in a snippet module 616. The calculated scores may also be used to rank the n-grams.

As an example and not by way of limitation, the score may be calculated based on an n-gram type similarity score that indicates a degree of similarity of the n-gram to an n-gram type as described with reference to FIGS. 8A-F. As an example and not by way of limitation, the score may be calculated based on a term frequency-inverse document frequency (TF-IDF) score of the n-gram associated with social-networking data of the online social network. Although this disclosure describes scoring particular content in a particular manner, the disclosure contemplates scoring any suitable content in any suitable manner.

In particular embodiments, the calculated scores may be used to generate one or more n-grams for inclusion in a snippets-module 616. As an example and not by way of limitation, the extracted n-grams may be ranked based upon their associated scores. One or more of the highest-ranked n-grams, e.g., the highest ranked, second-highest-ranked, and third-highest-ranked n-grams, may be selected for use as snippets in a snippets-module 616. That is, a threshold number (e.g., three in this example) of the highest-ranked n-grams may then be selected. The selected n-grams may then be used as the text of the snippets-module 616. As an example, the n-grams "tempura brie", "sushi happy hour", "miso-glazed eggplant", and "fried tofu" may be extracted from relevant posts and reviews of the restaurant entity "Japonessa Sushi Cocina" with associated scores of 90, 80, 30, and 50, respectively. If the threshold number of n-grams to be selected is 3, then in this example the n-grams selected for inclusion in the snippet-module 616 are "tempura brie", "sushi happy hour", and "fried tofu", respectively and in that order, because those are the top three n-grams in order of decreasing score. Although this disclosure describes selecting extracted n-grams for use as snippets in a snippets-module 616 in a particular manner, the disclosure contemplates selecting extracted n-grams for use as snippets in a snippets-module 616 in any suitable manner.

Figure 7:
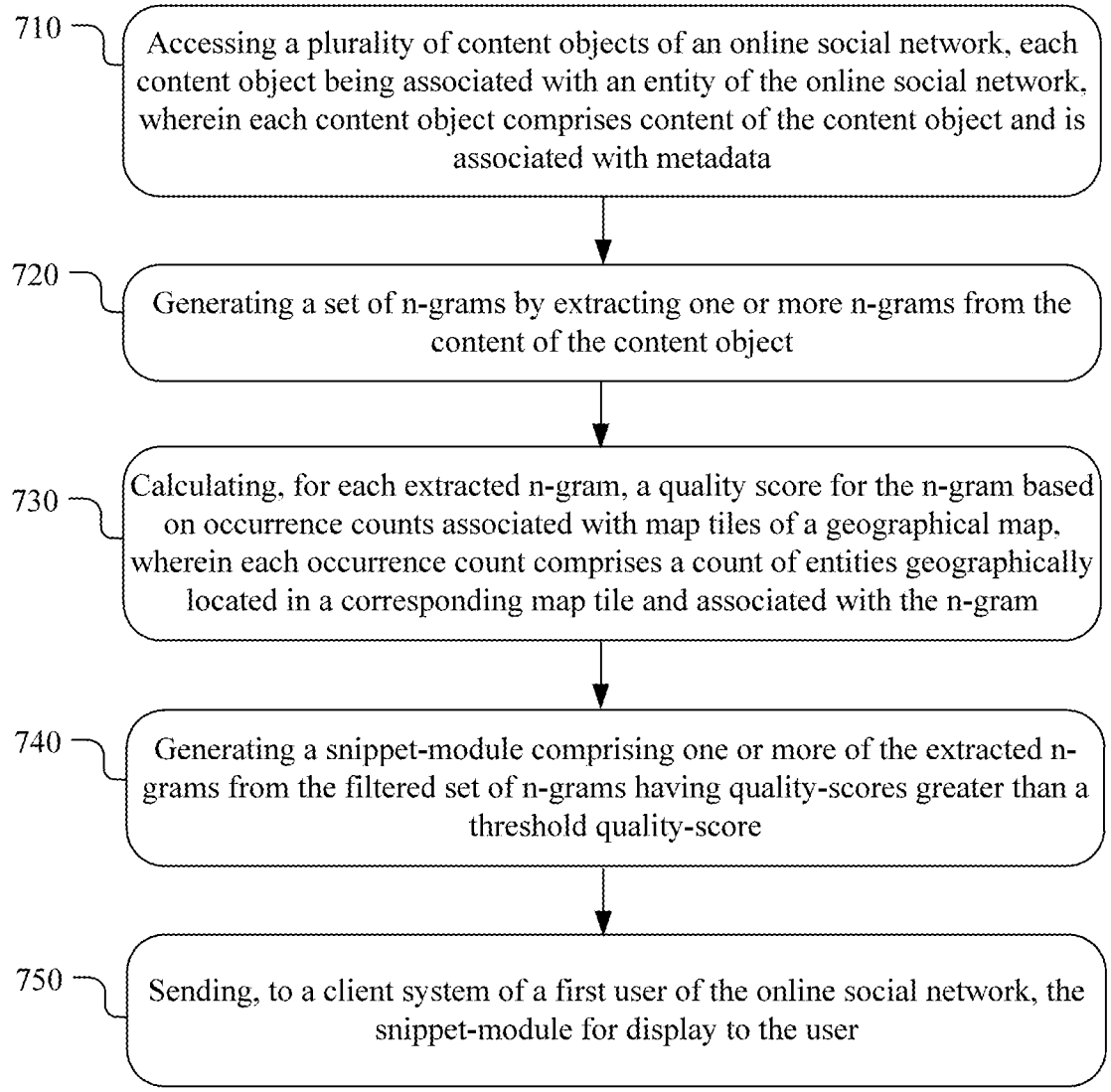
FIG. 7 illustrates an example method for generating a snippet-module.

FIG. 7 illustrates an example method 700 for generating a snippet-module. The method may begin at step 710, where the social-networking system 160 may access a plurality of content objects of an online social network, each content object being associated with an entity of the online social network, wherein each content object comprises content of the content object and is associated with metadata, and the entity is in a first map tile of a geographical map. At step 720, the social-networking system 160 may generate a set of n-grams by extracting one or more n-grams from the content of the content object. At step 730, the social-networking system 160 may calculate, for each extracted n-gram, a quality score for the n-gram based on occurrence counts associated with map tiles of a geographical map, wherein each occurrence count comprises a count of entities geographically located in a corresponding map tile and associated with the n-gram. Step 730 may invoke the method 800 of FIG. 8A to calculate the quality score. At step 740, the social-networking system 160 may generate a snippet-module comprising one or more of the extracted n-grams from the filtered set of n-grams having quality-scores greater than a threshold quality-score. At step 750, the social-networking system 160 may send, to a client system of a first user of the online social network, the snippet-module for display to the user.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating snippet-modules including the particular steps of the method of FIG. 7, this disclosure contemplates any suitable method for generating snippet-modules including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

FIG. 8A illustrates an example method 800 for calculating a similarity score for an n-gram. The method 800 may be invoked by, for example, step 730 of FIG. 7. The method 800 may begin at step 802, where the social-networking system 160 may receive a quality score to be updated based on an n-gram and an entity. At step 804, the social-networking system 160 may determine, based on the n-gram, an n-gram type and a similarity score indicating the degree of similarity of the n-gram to the n-gram type, e.g., by determining similarity scores between the n-gram and one or more n-gram types, and selecting the type having the closest similarity (e.g., greatest similarity score), as described with reference to FIG. 8B. Similarity scores between the n-gram and the different entity types may be calculated as described below. For example, the similarity score between the n-gram and a location n-gram type may be calculated as described with reference to FIGS. 8C and 8D. As another example the similarity score between the n-gram and an event n-gram type may be calculated as described with reference to FIGS. 8E and 8F. At step 806, the social-networking system 160 may determine whether the n-gram's type is informative for the entity's type. For example, the n-gram's type may be informative for the entity's type if the n-gram's type is informative for the vertical associated with the entity's type. The determination of whether an n-gram type is informative for an entity may be made based on table of n-gram types and Boolean values indicating whether each n-gram type in the tale is informative for the entity. If the n-gram's type is informative for the entity's type, at step 808 the social-networking system 160 may increase the quality score based on the similarity score, e.g., by adding the similarity score to the quality score. If the n-gram's type is not informative for the entity's type, at step 810 the social-networking system 160 may decrease the quality score based on the similarity score. For example, step 810 may subtract the similarity score from the quality score. Alternatively, step 810 may leave the quality score unchanged, e.g., so that the quality score is increased when the n-gram type is informative for the entity, and unchanged when the n-gram type is not informative for the entity.

Particular embodiments may repeat one or more steps of the method of FIG. 8A, where appropriate. Although this disclosure describes and illustrates particular steps of the method of FIG. 8A as occurring in a particular order, this disclosure contemplates any suitable steps of the method of FIG. 8A occurring in any suitable order. Moreover, although this disclosure describes and illustrates an example method for determining whether to include an n-gram in an entity's set of n-grams including the particular steps of the method of FIG. 8A, this disclosure contemplates any suitable method for determining whether to include an n-gram in an entity's set of n-grams including any suitable steps, which may include all, some, or none of the steps of the method of FIG. 8A, where appropriate. Furthermore, although this disclosure describes and illustrates particular components, devices, or systems carrying out particular steps of the method of FIG. 8A, this disclosure contemplates any suitable combination of any suitable components, devices, or systems carrying out any suitable steps of the method of FIG. 8A.

FIG. 8B illustrates an example method 820 for determining an n-gram type for a given n-gram. The method 820 may be invoked by, for example, step 804 of the method 800 illustrated in FIG. 8A. The method 820 may begin at step 822, where the social-networking system 160 may receive an n-gram for which an n-gram type is to be determined. At step 824, the social-networking system 160 may initiate a loop that executes the subsequent step for each of one or more predetermined n-gram types, which may include the location n-gram type, the event n-gram type, the sentiment n-gram type, the topic n-gram type, and any other types not listed here. At step 826, the social-networking system 160 may calculate a corresponding similarity score based on the one of the predetermined n-gram types selected at step 824 and the received n-gram. The similarity score may be calculated by, for example, invoking one of the methods shown in FIGS. 8C and 8D (which may generate similarity scores for location-type n-grams) and FIGS. 8E and 8F (which may generated similarity scores for event-type n-grams). The similarity score may also be calculated by invoking methods that generate similarity scores for sentiment-type n-grams and topic-type n-grams. A method that generates similarity scores for sentiment-type n-grams may determine whether the n-gram comprises a sentiment name, and, when the n-gram comprises a sentiment name, increasing the similarity score. A method that generates similarity scores for topic-type n-grams may generate, using a topic tagger, one or more topics based on the n-gram, wherein the similarity score is based on a result of the topic tagger.

At step 828, the social-networking system 160 may determine whether there is another n-gram type to process. If so, step 826 executes again; if not, execution continues to step 830. At step 830, the social-networking system 160 may select one of the predetermined n-gram types for which the corresponding similarity score satisfies a threshold similarity condition. The threshold similarity condition may be, for example, that the selected corresponding similarity score is the greatest of the similarity scores calculated at step 826 for the current n-gram. The threshold similarity condition may alternatively or additionally be that the selected corresponding similarity score is greater than or equal to a threshold value. For example, if the similarity score is a number between 0 and 1, then the threshold value may be 0.5, 0.75, 0.9, or the like. At step 832, the social-networking system 160 may set the n-gram type of the received n-gram to the selected one of the predetermined n-gram types. At step 834, the social-networking system 160 may set the similarity score of the received n-gram to the corresponding similarity score that satisfies the threshold similarity condition.

Particular embodiments may repeat one or more steps of the method of FIG. 8B, where appropriate. Although this disclosure describes and illustrates particular steps of the method of FIG. 8B as occurring in a particular order, this disclosure contemplates any suitable steps of the method of FIG. 8B occurring in any suitable order. Moreover, although this disclosure describes and illustrates an example method for determining whether to include an n-gram in an entity's set of n-grams including the particular steps of the method of FIG. 8B, this disclosure contemplates any suitable method for determining whether to include an n-gram in an entity's set of n-grams including any suitable steps, which may include all, some, or none of the steps of the method of FIG. 8B, where appropriate. Furthermore, although this disclosure describes and illustrates particular components, devices, or systems carrying out particular steps of the method of FIG. 8B, this disclosure contemplates any suitable combination of any suitable components, devices, or systems carrying out any suitable steps of the method of FIG. 8B.

FIG. 8C illustrates an example method 850 for calculating a similarity between an n-gram and a location n-gram type based on the fraction of entities associated with the n-gram that are located in the same map tile as the entity for which the n-gram's quality score is being computed. The method 850 may be invoked by, for example, step 826 of the method 820 illustrated in FIG. 8B. The method 850 may begin at step 852, where the social-networking system 160 may determine a count of entities in a first map tile of the geographical map that are associated with the n-gram, wherein the entity of the online social network is in the first map tile. At step 854, the social-networking system 160 may determine a count of entities in one or more second map tiles of the geographical map that are associated with the n-gram. At step 856, the social-networking system 160 may calculate the similarity score based on a ratio of the count of entities in the first map tile to the count of entities in the second map tiles. The similarity score calculated at step 856 may be combined with one or more other similarity scores calculated according to other methods, such as that shown in FIG. 8D, to generate a composite location-type similarity score for the n-gram. For example, the similarity score calculated by the method of FIG. 8C may be averaged with the similarity score calculated by the method of FIG. 8D so that the combined score is based on (1) the fraction of entities associated with the n-gram that are located in the same map tile as the entity for which the n-gram's quality score is being computed and (2) the fraction of map tiles in which an entity associated with the n-gram is located, which may provide a more accurate measure of the similarity of the n-gram to the criteria for a geographical location than either (1) or (2) separately.

Particular embodiments may repeat one or more steps of the method of FIG. 8C, where appropriate. Although this disclosure describes and illustrates particular steps of the method of FIG. 8C as occurring in a particular order, this disclosure contemplates any suitable steps of the method of FIG. 8C occurring in any suitable order. Moreover, although this disclosure describes and illustrates an example method for determining whether to include an n-gram in an entity's set of n-grams including the particular steps of the method of FIG. 8C, this disclosure contemplates any suitable method for determining whether to include an n-gram in an entity's set of n-grams including any suitable steps, which may include all, some, or none of the steps of the method of FIG. 8C, where appropriate. Furthermore, although this disclosure describes and illustrates particular components, devices, or systems carrying out particular steps of the method of FIG. 8C, this disclosure contemplates any suitable combination of any suitable components, devices, or systems carrying out any suitable steps of the method of FIG. 8C.

FIG. 8D illustrates an example method 860 for calculating a similarity between an n-gram and a location n-gram type based on the fraction of map tiles in which an entity associated with the n-gram is located. The method 860 may be invoked by, for example, step 826 of the method 820 illustrated in FIG. 8B, and/or may be executed subsequently to the method of FIG. 8C. The method 860 may begin at step 862, where the social-networking system 160 may determine a count of map tiles that include one or more entities that are associated with the n-gram. At step 864, the social-networking system 160 may calculate the similarity score based on a ratio of the count of map tiles that include one or more entities that are associated with the n-gram to a total number of map tiles in the geographical map. The similarity score calculated at step 864 may be combined with the similarity score calculated by the method of FIG. 8C, e.g., by averaging the two scores as described with reference to FIG. 8C.

Figure 8E:
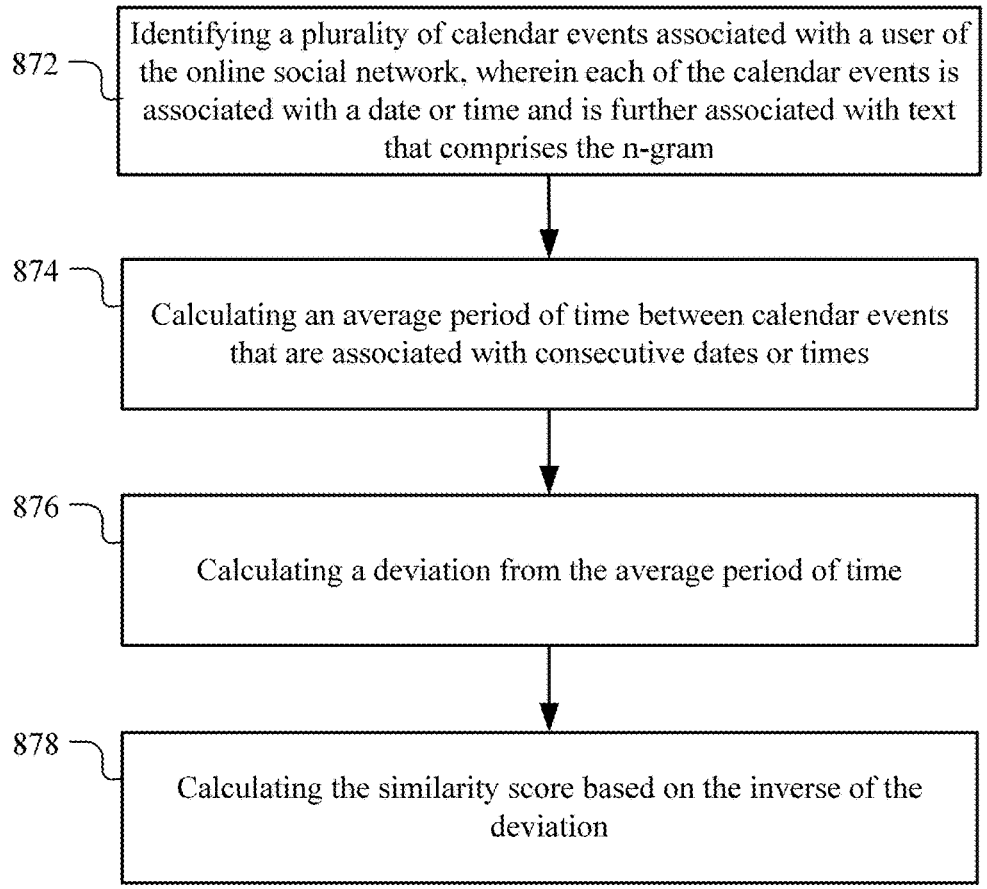
FIG. 8E illustrates an example method for calculating a similarity between an n-gram and an event n-gram type based on a deviation of dates of calendar events associated with the n-gram from an average time interval between the calendar events.

FIG. 8E illustrates an example method 870 for calculating a similarity between an n-gram and an event n-gram type based on a deviation of dates of calendar events associated with the n-gram from an average time interval between the calendar events. The method 870 may be invoked by, for example, step 826 of the method 820 illustrated in FIG. 8B. The method 870 may begin at step 872, where the social-networking system 160 may identify a plurality of calendar events associated with a user of the online social network. Each of the calendar events may be associated with a date or time and with text that comprises the n-gram. At step 874, the social-networking system 160 may calculate an average period of time between calendar events that are associated with consecutive dates or times. At step 876, the social-networking system 160 may calculate a deviation from the average period of time. The deviation may be, for example, the standard deviation of the dates or times associated with the calendar events from the average period of time. At step 878, the social-networking system 160 may calculate the similarity score based on the inverse of the deviation. For example, if the deviation is 0.2, the similarity score may be set to 1/0.2 or, alternatively, to 1-0.2, so that smaller deviations correspond to larger similarity scores. The similarity score calculated at step 878 may be combined with one or more other similarity scores calculated according to other methods, such as that shown in FIG. 8F, to generate a composite event-type similarity score for the n-gram. For example, the similarity score calculated by the method of FIG. 8E may be averaged with the similarity score calculated by the method of FIG. 8F so that the combined score is based on (1) the deviation of times between consecutive events times from the average period of time and (2) the ratio of the count of calendar events to a maximum number of time periods in which the range of time during which the calendar events occur, which may provide a more accurate measure of the similarity of the n-gram to the criteria for a periodic event other than either (1) or (2) separately.

Figure 8F:
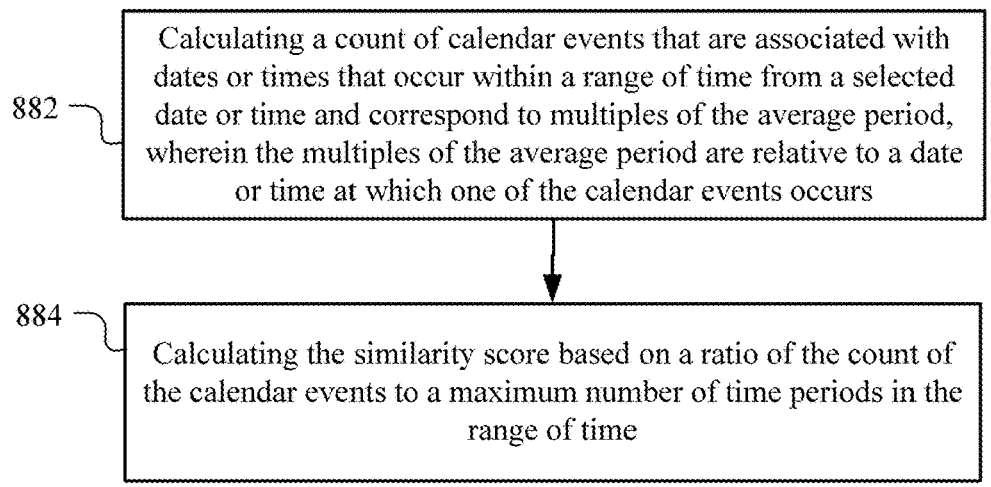
FIG. 8F illustrates an example method for calculating a similarity between an n-gram and an event n-gram type based on a fraction of calendar events associated with the n-gram that occur on multiples of the average time interval between the calendar events in a range of time.

FIG. 8F illustrates an example method 880 for calculating a similarity between an n-gram and an event n-gram type based on a fraction of calendar events associated with the n-gram that occur on multiples of the average time interval between the calendar events in a range of time. The method 880 may be invoked by, for example, step 826 of the method 820 illustrated in FIG. 8B, and/or may be executed subsequently to the method of FIG. 8E. The method 880 may begin at step 882, where the social-networking system 160 may calculate a count of calendar events that are associated with dates or times that occur within a range of time from a selected date or time and correspond to multiples of the average period, wherein the multiples of the average period are relative to a date or time at which one of the calendar events occurs. At step 884, the social-networking system 160 may calculate the similarity score based on a ratio of the count of the calendar events to a maximum number of time periods in the range of time. The similarity score calculated at step 884 may be combined with the similarity score calculated by the method of FIG. 8E, e.g., by averaging the two scores as described with reference to FIG. 8E.

FIGS. 9A, 9B, and 9C illustrate example distributions of n-grams over tiles of maps. In FIG. 9A, three n-grams occur in the upper-left tile. Using the upper-left tile as the entity's tile, which is the first tile, the quality score may be calculated as follows. As described above, the quality score for a location n-gram=(similarity score (1)+similarity score (2))/2. Score (2)=1−n/N, where n is the number of tiles that have at least one n-gram, and N is the number of tiles. Score (1)=the number of occurrences of the n-gram in the first tile/the number of occurrences in the n-gram across all tiles in the map. In the example of FIG. 9A, score (2)=1−3/3=1 (on a scale of 0 to 1), which indicates a high degree of locality. Score (1)=3/3=1. Therefore, the quality score=the average of scores (1) and (2)=(1+1)/2=1, and the occurrence of all n-grams in the first tile corresponds to a high degree of locality. In FIG. 9B, score (2)=1−9/9=0, and score (1)=1/9, which both indicate low degrees of locality. The quality score=(0+1/9)/2=0.06, so the occurrence of one n-gram in each tile corresponds to a low degree of locality. In FIG. 9C, score (2)=5/9, which indicates a medium degree of locality, and score (1)=1/5, which indicates a low degree of locality. The quality score=(5/9+1/5)/2=0.38, which indicates a medium degree of locality.

System and Methods

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
   accessing a plurality of content objects of an online social network, each content object being associated with an entity of the online social network, wherein each content object comprises content of the content object and is associated with metadata;
   generating a set of n-grams by extracting one or more n-grams from the contents of the content objects;
   calculating, for each extracted n-gram, a quality score for the n-gram based on an occurrence count of the n-gram with respect to one or more map tiles of a geographical map, wherein the occurrence count of the n-gram comprises a count of entities associated with the n-gram that are geographically located in the one or more map tiles;

generating a snippet-module comprising one or more of the extracted n-grams from the set of n-grams having quality-scores greater than a threshold quality-score; and sending, to a client system of a user of the online social network, instructions for presenting the snippet-module to the user.

2. The method of claim 1, wherein calculating the quality score for the n-gram comprises:

calculating a similarity score that indicates a degree of similarity between the n-gram and an n-gram type.

3. The method of claim 2, wherein calculating the quality score for the n-gram comprises:

determining an n-gram type for the n-gram based on the similarity score;

determining whether the n-gram type is informative for each of the entities; and increasing the quality score based on the similarity score when the n-gram type is informative for the entity.

4. The method of claim 3, wherein determining an n-gram type for the n-gram based on the similarity score is based on whether the similarity score satisfies a threshold similarity condition.

5. The method of claim 3, wherein determining the n-gram type for the n-gram comprises:

for each of one or more predetermined n-gram types, calculating a corresponding similarity score based on the one of the predetermined n-gram types and the n-gram; and selecting one of the predetermined n-gram types for which the corresponding similarity score satisfies a threshold similarity condition, wherein the n-gram type corresponds to the selected one of the predetermined n-gram types.

6. The method of claim 5, wherein the corresponding similarity score satisfies the threshold similarity condition when the corresponding similarity score satisfies a threshold similarity value and is a maximum of the one or more similarity scores.

7. The method of claim 3, wherein calculating the quality score for the n-gram further comprises:

decreasing the quality score based on the similarity score when the n-gram type is not informative for each of the entity.

8. The method of claim 3, wherein the n-gram type comprises one or more of a location type, an event type, a sentiment type, or a topic type.

9. The method of claim 2, wherein calculating the similarity score based on the n-gram comprises:

determining a count of entities in a first map tile of the geographical map that are associated with the n-gram, wherein the entity of the online social network is in the first map tile; and determining a count of entities in one or more second map tiles of the geographical map that are associated with the n-gram, wherein the similarity score is based on a ratio of the count of entities in the first map tile to the count of entities in the second map tiles.

10. The method of claim 9, wherein calculating the similarity score based on the n-gram further comprises:

determining a count of map tiles that include one or more entities that are associated with the n-gram, wherein the similarity score is further based on a ratio of the count of map tiles that include one or more entities that are associated with the n-gram to a total number of map tiles in the geographical map.

11. The method of claim 2, wherein calculating the similarity score based on the n-gram comprises:

increasing the similarity score when the n-gram comprises at least one word or phrase having a periodic meaning.

12. The method of claim 2, wherein calculating the similarity score based on the n-gram comprises:

identifying a plurality of calendar events associated with a user of the online social network, wherein each of the calendar events is associated with a date or time and is further associated with text that comprises the n-gram;

calculating an average period of time between calendar events that are associated with consecutive dates or times; and calculating a deviation from the average period of time, wherein the similarity score is based on the deviation.

13. The method of claim 12, wherein calculating the similarity score based on the n-gram further comprises:

calculating a count of the calendar events that are associated with dates or times that occur within a range of time from a selected date or time and correspond to multiples of the average period, wherein the multiples of the average period are relative to a date or time at which one of the calendar events occurs, wherein the similarity score is further based on a ratio of the count of the calendar events to a maximum number of time periods in the range of time.

14. The method of claim 2, wherein calculating the similarity score based on the n-gram comprises:

determining whether the n-gram comprises a sentiment name; and when the n-gram comprises a sentiment name, increasing the similarity score.

15. The method of claim 2, wherein calculating the similarity score based on the n-gram comprises:

generating, using a topic tagger, one or more topics based on the n-gram, wherein the similarity score is based on a result of the topic tagger.

16. The method of claim 15, wherein the similarity score is based on a confidence value generated by the topic tagger.

17. The method of claim 1, wherein calculating the quality score for the n-gram comprises boosting the quality score when the n-gram comprises one or more specified words or matches a specified pattern.

18. The method of claim 1, further comprising:

determining whether the extracted n-gram is a synonym for another word or phrase; and using other word or phrase instead of the extracted n-gram when the extracted n-gram is a synonym for the other word or phrase.

19. The method of claim 1, wherein the entities are associated with the n-gram when each of the entities is associated with a snippet-module comprising the n-gram.

20. The method of claim 1, further comprising:

accessing a social graph comprising a plurality of nodes and a plurality of edges connecting the nodes, each of the edges between two of the nodes representing a single degree of separation between them, the nodes comprising:

a first node corresponding to a first entity; and a plurality of second nodes corresponding to a plurality of second entities located in a plurality of second map tiles, respectively.

21. A system comprising: one or more processors; and a memory coupled to the processors comprising instructions executable by the processors, the processors being operable when executing the instructions to:
- access a plurality of content objects of an online social network, each content object being associated with an entity of the online social network, wherein each content object comprises content of the content object and is associated with metadata;
- generate a set of n-grams by extracting one or more n-grams from the contents of the content objects;
- calculate, for each extracted n-gram, a quality score for the n-gram based on an occurrence count of the n-gram with respect to one or more map tiles of a geographical map, wherein the occurrence count of the n-gram comprises a count of entities associated with the n-gram that are geographically located in one or more map tiles;
- generate a snippet-module comprising one or more of the extracted n-grams from the set of n-grams having quality-scores greater than a threshold quality-score; and
- send, to a client system of a user of the online social network, instructions for presenting the snippet-module to the user.

22. One or more computer-readable non-transitory storage media embodying software that is operable when executed to:
- access a plurality of content objects of an online social network, each content object being associated with an entity of the online social network, wherein each content object comprises content of the content object and is associated with metadata;
- generate a set of n-grams by extracting one or more n-grams from the contents of the content objects;
- calculate, for each extracted n-gram, a quality score for the n-gram based on an occurrence count of the n-gram with respect to one or more map tiles of a geographical map, wherein the occurrence count of the n-gram comprises a count of the entities geographically located in the one or more map tiles;
- generate a snippet-module comprising one or more of the extracted n-grams from the set of n-grams having quality-scores greater than a threshold quality-score; and
- send, to a client system of a user of the online social network, instructions for presenting the snippet-module to the user.

* * * * *